RESISTOR CIRCUIT ASSEMBLY FOR SEQUENTIALLY FLASHING PHOTOFLASH LAMPS

Filed Aug. 3, 1970 2 Sheets-Sheet 1

Inventor:
Edward L. Laskowski
by Norman C. Fulmer
His Attorney

Inventor:
Edward L. Laskowski
by Norman C. Fulmer
His Attorney

United States Patent Office 3,676,046
Patented July 11, 1972

3,676,046
RESISTOR CIRCUIT ASSEMBLY FOR SEQUENTIALLY FLASHING PHOTOFLASH LAMPS

Edward L. Laskowski, Parma, Ohio, assignor to General Electric Company

Filed Aug. 3, 1970, Ser. No. 60,298
Int. Cl. F21k *5/02;* H05b *37/00*
U.S. Cl. 431—95 12 Claims

ABSTRACT OF THE DISCLOSURE

A resistor circuit, and assembly, for causing sequential flashing of a plurality of photoflash lamps from pulses of electrical energy. A first series of resistors are successively connected between first leads of the flash lamps, and a second series of resistors are successively connected between second leads of the flash lamps. The source of firing pulses is connected to a lead of a first lamp at one end of the circuit, and to the leads of the last lamp at the other end of the circuit via a resistance network. The assembly consists of an elongated U-shaped strip of resistance material, with the lamps positioned therealong and the leads of each lamp connected to adjacent points on the respective legs of the U-shaped strip. A second similar assembly of a U-shaped resistance strip and lamps connected thereto, is interposed with the first such assembly to provide a double array of flash lamps in a single unit.

BACKGROUND OF THE INVENTION

The invention is in the field of electrical circuitry, and assemblies, for sequentially flashing photoflash lamps, and is particularly useful with a unitary linear array of flash lamps, such as three or four or more lamps arranged to radiate their light in the same direction when they are sequentially flashed, so that the array need not be moved nor removed until all of its lamps have been flashed.

Numerous circuits have been devised for successively flashing photoflash lamps by pulses of electrical energy such as are obtained from a battery through a momentarily closed switch or from a capacitor which has been chared through a resistor from a battery, or from some other suitable energy source. Such a pulse of electrical energy usually is initiated by closure of a switch associated with the shutter mechanism of a camera. A type of circuit heretofore proposed employs mechanically actuated switches for applying the electrical pulses to sucessively different flashbulbs; another type of circuit utilizes heat-responsive or light-responsive means associated with the flash lamps and adapted to actuate switching means for connecting the pulse source to successively different flash lamps as each lamp becomes flashed; and a further type of circuit utilizes transistors or thyristors for automatically connecting the pulse source to successively different flash lamps as each lamp becomes flashed.

Another previously proposed circuit employs resistors successively connected in series with a plurality of individual flash lamps, so that the lamps are connected in electrical parallel through the resistors. The firing pulse source is connected to an end of the circuit, whereby each flash lamp is connected across the pulse source through successively greater resistance. The first pulse flashes the nearest lamp, which becomes an open circuit upon flashing, whereupon the next pulse flashes the next lamp, etc. Because of the nature of such a circuit, i.e., voltage division between a fixed series resistor and the flash lamp resistance, every remaining unflashed lamp receives energy during the application of a firing pulse. Although the series resistances are chosen so that only one lamp flashes for every firing pulse, the remaining unflashed lamps receive a certain amount of energy. This can have a determental effect on subsequent flashing, because such energy can cause primer material to partially oxidize, making subsequent flashing less reliable. This effect can be reduced with the increase in value of the series resistors, but only at the expense of a larger firing pulse energy and voltage. These difficulties tend to offset an important advantage of the resistance network circuit: its low cost, so that the resistor circuit can be included in a throw-away multiple lamp unit, whereby only two electrical connections need be provided between the multiple lamp unit and the camera or flash adaptor with which it is used.

SUMMARY OF THE INVENTION

Objects of the invention are to provide a new and improved resistance type of circuit for sequentially flashing flashbulbs, and to provide such a circuit and a construction thereof that is low in cost and highly reliable in operation.

The invention comprises, briefly and in a preferred embodiment, a plurality of photoflash lamps intended to be sequentially flashed by a sequential series of firing voltage pulses, a first series of resistors successively connected between first leads of the flash lamps, a second series of reistors successively connected between second leads of the flash lamps, means for connecting a lead of a first lamp at one end of the circuit to a source of firing voltage pulses, and a resistance network connected across the leads of the last lamp at the other end of the circuit and having a tap thereon adapted for connection to the source of firing voltage pulses. A preferred assembly or construction of the invention comprises an elongated U-shaped strip of resistance material, the flash lamps being positioned therealong and the leads of each lamp being connected to adjacent points on the respective legs of the U-shaped strip. A second similar assembly of a U-shaped resistance strip and lamps connected thereto, is interposed with the first such assembly to provide a double array of flash lamps in a single unit. Each of the flash lamps may be provided with an individual reflector in a manner to provide a back-to-back double array of flash lamps.

DESCRIPTION OF THE PREFERRED EMBODIMENT

Figure 1:
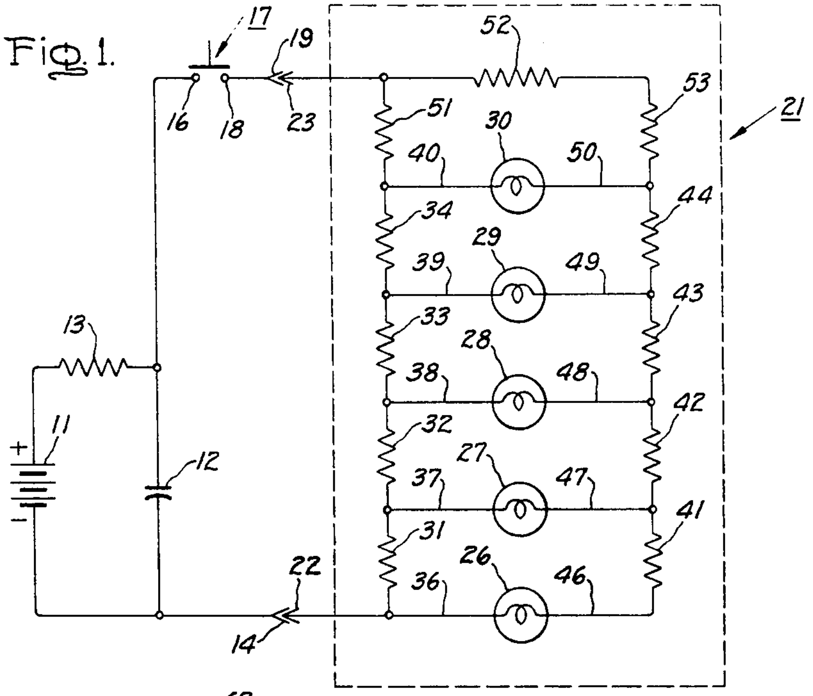
FIG. 1 is an electrical schematic circuit diagram of a preferred embodiment of the invention.

In the circuit of FIG. 1, a battery 11 is connected to charge a capacitor 12 through a resistor 13. In a preferred arrangement, the battery 11 has a voltage of 45 volts, the capacitor 12 has a capacitance of 120 microfarads, and the resistor 13 has a resistance of 3000 ohms. One terminal of the capacitor 12 is connected to a connector terminal 14, and the other terminal of capacitor 12 is connected to a terminal 16 of a switch 17, the other terminal 18 thereof being connected to a second connector terminal 19. The switch 17 is adapted to be momentarily closed in synchronization with the opening of a camera shutter, in well-known manner. The circuit thus far described functions as a source of electrical energy pulses for firing photoflash lamps, and may be incorporated in a camera or in a flash attachment for use with a camera. Although the firing pulse is sometimes called a "voltage" pulse, it is primarily the energy of the pulse, comprising the combination of voltage, current, and time duration, that causes a lamp to flash.

A flash lamp array unit 21 is provided with a pair of contact terminals 22 and 23 adapted for electrical engagement with the terminals 14 and 19, respectively. The unit 21 contains a plurality of photoflash lamps 26–30 which may be of conventional type such as General Electric type AG–1, each containing a filament provided with electrical connection lead wires and adapted for initiating a flash of combustible material contained within the bulb. A first series of four resistors 31–34 are successively connected between first leads 36–40 of the flash lamps 26–30, and a second series of four resistors 41–44 are successively connected between the second leads 46–50 of the flash lamps 26–30. The first lead 36 of the first flash lamp 26 is connected to the contact terminal 22, and the first lead 40 of the fifth and last flash lamp 30 is connected to the contact terminal 23 via a resistor 51. Resistors 52 and 53 are connected in series between the contact terminal 23 and the second lead 50 of the last flash lamp 30. Although the resistors 52 and 53 can be a single resistor, they are shown individually for purposes of describing the functioning of the invention later on. Preferably all of the resistors of the circuit comprise a single resistance element carried by a U-shaped strip of material as will be described subsequently.

Preferably the lamps 26–30 of the array 21 are provided with individual reflectors, and arranged to radiate the light emitted therefrom in the same direction. If desired, another combination of lamps and resistors may be provided in the unit 21, along with individual reflectors, for radiating the light emission therefrom in the opposite direction, so that when all of the lamps at the front of the unit have been flashed, the unit may be turned around so that the rear array of lamps will then face frontwardly, for obtaining an additional number of flashes from a single unit. Other contact terminals similar to 22 and 23 may be provided for connecting the rear array of lamp circuitry to the connectors 14 and 19 when the unit is turned around so that the "rear" array of flash lamps faces frontwardly.

If desired, the flash array unit 21 may be removed from the camera or flash adaptor after some of its lamps have been flashed, and reinserted at a later time for flashing the remaining lamps. After all of the lamps have been flashed, the array unit 21 may be discarded.

In a circuit for use with standard AG–1 photoflash lamps 26–30, each of which has a filament resistance of approximately 0.6 ohm, the resistor 52 may have a value of 0.6 ohm, and each of the remaining resistors of the circuit may have a value of 4 ohms.

The circuit of FIG. 1 functions as follows. Upon a momentary closing of the switch 17, in synchronization with the opening of a camera shutter, the electrical energy stored in the capacitor 12 discharges into the circuit of the lamp unit 21, in the form of an electrical pulse having an approximately exponential decay characteristic. It is a characteristic of the circuit of the invention, that resistor 52 and the first flash lamp 26 receive much more energy than that which flows through the remaining flash lamp filaments, whereby the first flash lamp 26 is caused to flash. Upon the next occurrence of a firing pulse, greater amounts of pulse energy flow through the resistor 52 and the next unflashed lamp, i.e., the second lamp 27, and very little pulse energy flows through the remaining unflashed lamps, whereupon the second lamp 27 is caused to flash. This procedure is repeated until all of the lamps have been flashed.

The reliability of firing only a single lamp per each firing pulse, is very high, which is a desirable feature of the circuit. For example, when the first lamp 26 is being flashed, it receives twenty-five times as much firing pulse energy as does any other of the lamps in the circuit. When the second and subsequent lamps are being flashed, they receive an even higher ratio of firing pulse voltage as compared with the remaining unflashed lamps.

The circuit may be considered as being a ladder network, in which the flash lamps 26–30 and the resistor 52 comprise cross-branches, whereupon when a firing pulse is applied thereto, the two outermost unflashed cross-branches receive a much greater portion of the firing pulse energy than do the inner cross-branches. The resistor 52 functions, in effect, as an unflashable "dummy" flash lamp, so that only the unflashed lamp nearest the other end of the ladder network will flash upon the occurrence of a firing pulse. It is a characteristic of this ladder network that it delivers very little energy to unflashed lamps centered between the "dummy" lamp 52 and any intended lamp to be flashed. For example, when lamp 26 is flashed, lamps 28 and 29 receive an insignificant amount of energy. Lamps 27 and 30 receive a very small amount of energy, about one twenty-fifth of that which lamp 26 receives. During the next flashing when lamp 27 is to be flashed, theoretically lamp 29 will receive no energy, and lamps 28 and 30 receive an insignificant amount. This characteristic tends to improve reliability by reducing partial oxidation of the primer material of unflashed lamps.

Figure 2:
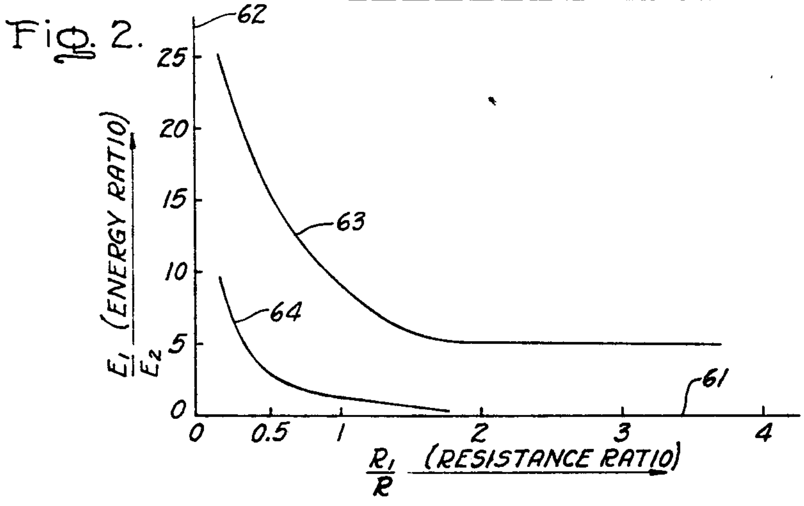
FIG. 2 is a graph illustrating the electrical design of the invention.

FIG. 2 shows curves illustrating design criteria for selecting the values of the series resistors of the ladder network as compared to the resistance values of the flash lamps 26–30 and the "dummy" unflashable lamp resistance 52. In FIG. 2, the horizontal axis 61 represents the ratio of $R_L$ to R, $R_L$ being the resistance value of each of the lamps 26–30 and the resistor 52, and R being the resistance value of each of the series resistors successively connected between the lamps and resistor 52. The vertical axis 62 represents the energy ratio of $E_1$ to $E_2$ of firing pulse energy applied to two different flash lamps in the circuit. For the purpose of curve 63, which represents the firing pulse energy applied to the first lamp 26 as compared to the firing pulse energy applied to the second lamp 27, $E_1$ represents pulse energy applied to the first lamp 26, and $E_2$ represents the firing pulse energy applied to the second lamp 27 during the flashing of the first lamp 26. Curve 64 represents the "worst case energy ratio," which is the ratio of firing pulse energy of lowest value that is applied to a lamp to be flashed as compared to the highest amount of pulse energy that reaches a lamp not to be flashed. In the circuit of FIG. 1, the lowest amount of pulse energy that reaches the lamp to be flashed, is that which flows in the last lamp 30, and the greatest amount of firing pulse energy to flow in a lamp not to be flashed, is that which flows in the second lamp 27 when the first lamp 26 is being flashed. For reliable operation of the circuit, it is desired that both of these criteria, as shown by the curves 63 and 64 in FIG. 2, be sufficiently high. As indicated by the curves 63 and 64, when the ratio $R_L$ to R is a bit less than 0.2, the circuit reliability is quite high. Thus, as shown by curve 63, when the first lamp 26 is being flashed it receives twenty-five times as much energy as does the second lamp 27, this being a highly satisfactory and reliable energy ratio; the ratio is even greater and hence more favorable for successive lamp firings. The preferred ratio of $R_L$ to R is less than one-half and greater than one-tenth.

FIG. 3 through 8 illustrate a construction or assembly in accordance with the invention, in which the flash lamps 26–30 are positioned in a row within a transparent housing 66, these lamps being provided with individual reflectors 71–75 arranged to direct the light emitted therefrom frontwardly of the housing 66.

Figure 4:
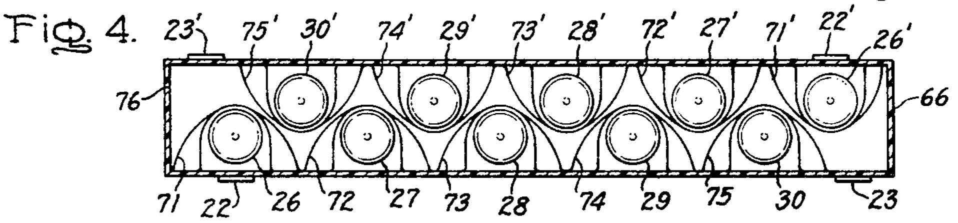
FIG. 4 is a cross-sectional view taken on the line 4—4 of FIG. 3.

As best shown in FIG. 4, the housing 66 also contains a second array of flash lamps 26′–30′, and associated individual reflectors 71′–75′, arranged to direct the light emitted therefrom in the opposite direction from that of the first array of lamps. To achieve compactness of the unit, the lamps and reflectors of the first and second arrays are staggered and are slightly intermeshed with one another, as illustrated in FIG. 4.

Figure 5:
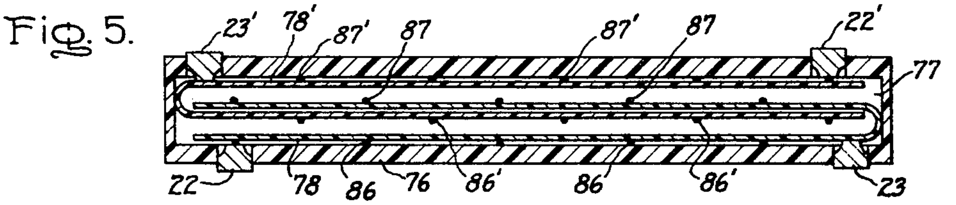
FIG. 5 is a cross-sectional view taken on the line 5—5 of FIG. 3.
Figure 7:
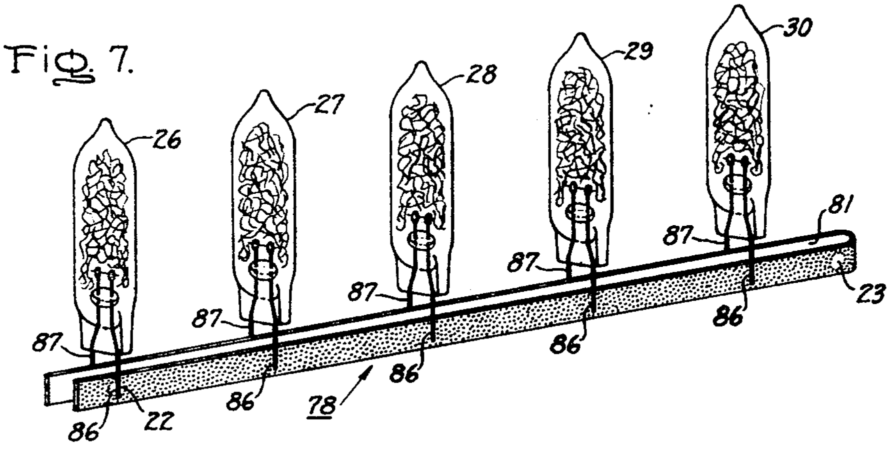
FIG. 7 is a perspective view of a plurality of flash lamps connected to a U-shaped strip of resistance material in accordance with a preferred embodiment of the invention.

A base portion 76 of the housing 66, which need not be transparent, is provided with an elongated cavity 77. First and second elongated U-shaped strips 78 and 78′ of resistance material are positioned in the cavity 77, as best shown in FIG. 5, in an interposed manner. As shown in FIG. 7, each of the U-shaped resistive strips may comprise a flexible (or non-flexible, if desired) strip of electrically insulative material such as Mylar shaped in the form of an elongated U and coated on the outer surface thereof with a resistance material 82 which may comprise finely powdered carbon particles painted on or otherwise carried by the outer surface thereof. As shown in FIG. 7, the lamps 26–30 of the array are positioned with respect to the U-shaped resistor 78 so that their first lead wires 86 bear against the resistive surface of one leg of the U-shaped resistance element at spaced intervals therealong, and the second leads 87 of the flash lamps bear against the resistive surface of the other leg of the resistance element at points adjacent the points of contact of the first leads 86. By providing a suitable resistance gradient for the resistive coating 82, and by properly spacing the lamp leads 86, 87 therealong, as shown in FIG. 7, the desired 4 ohms of resistance (or any other desired value) is successively provided between the lamp leads, thus providing the resistors 31–34 and 41–44 of the circuit shown in FIG. 1.

A contact member 22, which may be in the form of a metal cylindrical plug, extends through an opening in the base portion 76 of the housing, the inner end thereof being in contact with the first filament lead 86 of the first lamp 26, and the outer end thereof being exposed at the exterior of the base 76 so that it may make contact with the contact terminal 14 of the firing pulse source (FIG. 1). Similarly, the connector 23 may be in the form of a metal plug member extending through the front of the housing base 76, the interior end thereof being in electrical contact against the U-shaped resistance member 78 at the proper point, as shown, so as to be 4 ohms (or other desired resistance) away from the point of contact of the lead wire 86 of the last flash lamp 30. The other end of the connector plug 23 is exposed so as to be electrically connectable to the contact terminal 19 (FIG. 1). The curved base portion of the U-shaped resistance provides the 0.6 ohm for the resistor 52.

The lead wires 86′ and 87′ of the second array of lamps 26′–30′ are similarly arranged in contact with the resistive surface of the second U-shaped resistive strip 78′, as best shown in FIG. 5. The U-shaped resistive strips 78 and 78′ are interposed, with one leg of each being within the confines of the other, as shown in FIG. 5 and as better shown in the perspective view of FIG. 8.

Figure 8:
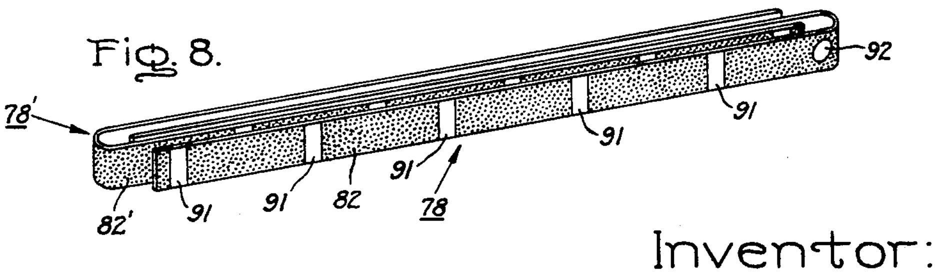
FIG. 8 is a perspective view of two interposed U-shaped strips of resistance material.
Figure 3:
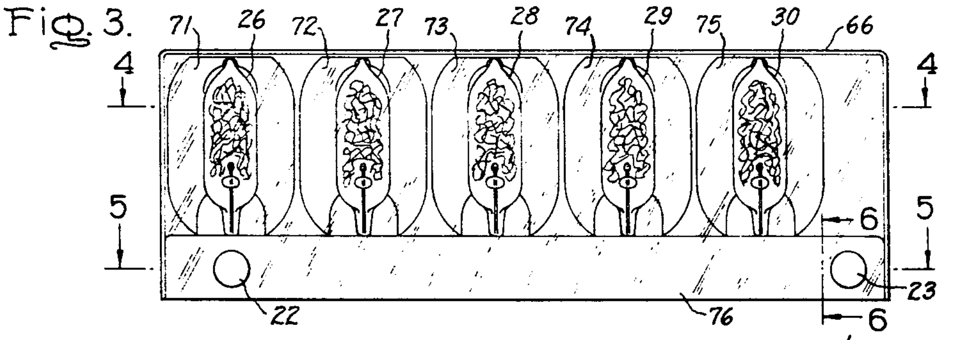
FIG. 3 is a front view of a double multiple flash lamp array constructed in accordance with a preferred embodiment of the invention.
Figure 6:
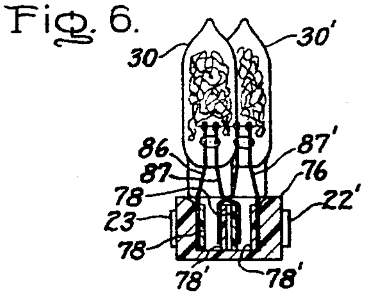
FIG. 6 is a cross-sectional view taken on the line 6—6 of FIG. 3.

In assembling the unit, the U-shaped resistor strips 78 and 78′ are interposed as shown in FIG. 8, and the flash lamps 26–30 and 26′–30′ are positioned with their leads appropriately inserted in the interposed combination of resistance elements 78 and 78′, and this assembly is positioned within the cavity 77 of the base portion 76 of the housing 66. As best shown in FIG. 6, the front and rear inner walls of the cavity 77 are tapered, to facilitate easy initial insertion of the assembly of flash lamps and resistor strips, and to cause a tight fitting of all of the flash lamp lead wires and resistor strips when the lead wires and resistor strips are fully positioned within the cavity 77, thus providing good electrical connections. This insures satisfactory electrical contact of each of the flash lamp lead wires with the appropriate points along the U-shaped resistance strips. The inner surfaces of the U-shaped strips provide electrical insulation to prevent short-circuiting between lamp leads and the resistive coating of the adjacent leg of the other U-shaped strip. The connector plugs 22, 23, 22′ and 23′ may then be inserted into place, and are held in place by a snug fit or by cementing.

If desired, the electrical connections may be improved and the assembly may be facilitated, if the lead wires 86 and 87 of the flash lamps are dipped in an electrically conductive cement prior to the above-described assembly operation. Also, the U-shaped resistance strips 78 and 78′ may be provided with electrical conductor strips 91 at the regions where the lamp leads 86 and 87 are to make connection to the resistance elements (FIG. 8). The conductors 91 may be applied with metallic paint, or may be plated or otherwise deposited onto the U-shaped resistor strips 78, 78′. Also, an electrically conductive region 92 may be applied at a suitable position along the conductive strips, for facilitating electrical contact with the connector plug 23.

The circuitry of the invention can be incorporated into a camera or flash adaptor instead of in a disposable flash array, with the requisite number of electrical connectors being provided for connecting the filament lead wires of the lamps 26, etc., of the array respectively to the different connection points at the junctions of the various resistors 31, etc., of the circuit.

It will be apparent that the circuit is economical to manufacture, since it may consist only of one or two strips of resistance material. The invention can be applied to various desired numbers of flash lamps.

While a preferred embodiment of the invention has been shown and described, other embodiments and modifications thereof will become apparent to persons skilled in the art, and will fall within the scope of invention as defined in the following claims.

What I claim as new and desire to secure by Letters Patent of the United States is:

1. A circuit for causing sequential flashing of a plurality of photoflash lamps from successive firing pulses of electrical energy, said circuit comprising a plurality of pairs of first and second connection points adapted for electrical connection thereto of respective leads of individual lamps of said photoflash lamps, each of said photoflash lamps having substantially the same resistance value $R_L$, wherein the improvement comprises a first series of resistors successively connected between said first connection points, a second series of resistors successively connected between said second connection points, means for connecting the first connection point at one end of the circuit to a source of said firing pulses, resistance means connected between the first and second connection points at the other end of the circuit, and means for connecting a point on said resistance means to said source of firing pulses, said point on said resistance means being substantially $R_L$ greater from the second than from the first of said connection points between which said resistance means is connected, whereby said circuit comprises a ladder network having cross-branch resistances of $R_L$ when said flash lamps are connected to said pairs of connection points.

2. A circuit as claimed in claim 1, in which each resistor in said first and second series of resistors has a resistance value of substantially R, and in which said resistance means comprises a resistance having a resistance value of $2R+R_L$, said point on the resistance means being R from said first connection point to which the resistance means is connected and $R+R_L$ from said second connection point to which the resistance means is connected.

3. A circuit as claimed in claim 2, in which the ratio of $R_L$ to R is less than one-half and greater than one-tenth.

4. A circuit for causing sequential flashing of a plurality of photoflash lamps from successive firing pulses of electrical energy, said circuit comprising a plurality of photoflash lamps each having first and second leads connected to a filament having a resistance of $R_L$, wherein the improvement comprises a resistor having a resistance value of $R_L$, a first series of resistor successively connected between said first leads and a first end of said resistor, a second series of resistors successively connected between said second leads and the second end of said resistors, said resistors being at an end of the circuit whereby the circuit forms a ladder network in which the resistor and photoflash lamps are cross-branches thereof, and means for connecting said first end of the resistor and the first lead of the photoflash lamp at the opposite end of the circuit from said resistor to a source of said firing pulses.

5. A circuit as claimed in claim 4, in which each resistor in said first and second series of resistors has a resistance value of R, and in which the ratio of $R_L$ to R is less than one-half and greater than one-tenth.

6. A unitary circuit assembly of photoflash lamps comprising a plurality of photoflash lamps arranged to emit light in a given direction and adapted to be sequentially flashed by successive firing pulses of electrical energy, each of said photoflash lamps having first and second filament leads and a filament having a resistance of substantially $R_L$, wherein the improvement comprises an elongated U-shaped resistance element, said flash lamps being positioned therealong between the open and closed ends thereof, means electrically connecting the first and second leads of each lamp to adjacent points on the respective first and second legs of the U-shaped resistance element, said points of connection of the individual lamps being spaced apart along said U-shaped resistance element, means for connecting a lead of the lamp connected to a first leg of said U-shaped resistance element nearest the open end thereof to a source of said firing pulses, and means for connecting a point on said first leg of the U-shaped resistance element between the closed end thereof and the nearest lamp lead connection to said source of firing pulses, said last-named point being substantially $R_L$ greater from the lamp lead on the second leg of the U-shaped resistance element nearest the closed end thereof than from said nearest lamp lead connection on the first leg, whereby said circuit comprises a ladder network having cross-branch resistances of $R_L$.

7. An assembly as claimed in claim 6, in which said U-shaped resistance element comprises a strip of flexible electrically insulative material provided with a coating of resistance material on the outer surface thereof.

8. An assembly as claimed in claim 7, including electrically conductive areas provided on said resistance material at said points of connection of said lamp leads.

9. An assembly as claimed in claim 6, including a second plurality of photoflash lamps arranged to emit light oppositely from said given direction and arranged in staggered relationship to the first plurality of flash lamps, each of said photoflash lamps having first and second filament leads and a filament having a resistance of substantially $R_L$, and further including a second elongated U-shaped resistance element interposed with the first U-shaped resistance element so that the second leg of each extends along and between the legs of the other, means electrically connecting the first and second leads of each lamp of said second plurality thereof to adjacent points on the respective first and second legs of the second U-shaped resistance element, said points of connection of the individual lamps being spaced apart along said second U-shaped resistance element, means for connecting a lead of the lamp connected to the first leg of said second U-shaped resistance element nearest the open end thereof to said source of firing pulses, and means for connecting a point on said first leg of the second U-shaped resistance element between the closed end thereof and the nearest lamp lead connection to said source of firing pulses, said last-named point being substantially $R_L$ greater from the lamp lead on the second leg of the second U-shaped resistance element nearest the closed end thereof than from said last-named nearest lamp lead connection, whereby said second resistance element and plurality of lamps comprises a second ladder network having cross-branch resistances of $R_L$.

10. An assembly as claimed in claim 9, in which each of said U-shaped resistance elements comprises a strip of flexible electrically insulative material provided with a coating of resistance material on the outer surface thereof whereby said strips provide electrical insulation between the first U-shaped resistance element and the lamp leads connected thereto and the second U-shaped resistance element and the lamp leads connected thereto.

11. An assembly as claim in claim 10, including a housing having a base provided with an elongated cavity, said assembly of interposed U-shaped resistance elements and lamp leads connected thereto being positioned in said cavity, the width of said cavity being dimensioned to compress the legs of said U-shaped resistance elements and lamp leads together to insure electrical contact between the lamp leads and the respective resistance elements.

12. An assembly as claimed in claim 11, wherein each of said means for connecting the first assembly of flash bulbs and resistance element to the source of firing pulses comprises a conductor plug member extending through one side of said base and into electrical contact with said first assembly, and wherein each of said means for connecting the second assembly of flash bulbs and resistance element to the source of firing pulses comprises a conductor plug member extending through the opposite side of said base and into electrical contact with said second assembly.

References Cited

UNITED STATES PATENTS

| | | | |
|---|---|---|---|
| 2,635,225 | 4/1953 | Haday | 236—78 UX |
| 3,518,487 | 6/1970 | Tanka et al. | 431—95 X |
| 3,532,931 | 10/1970 | Cote et al. | 431—95 X |

EDWARD J. MICHAEL, Primary Examiner

U.S. Cl. X.R.

315—232